Dec. 29, 1964  G. BAUMANN  3,163,272
CONTROL ARRANGEMENT FOR ELECTROMAGNETIC CLUTCH
Filed July 25, 1962  2 Sheets-Sheet 1

INVENTOR
Guenther Baumann
by: Michael S. Striker

Dec. 29, 1964   G. BAUMANN   3,163,272
CONTROL ARRANGEMENT FOR ELECTROMAGNETIC CLUTCH
Filed July 25, 1962   2 Sheets-Sheet 2

INVENTOR
Guenther Baumann
by:
Michael J. Striker
Atty

United States Patent Office 3,163,272
Patented Dec. 29, 1964

3,163,272
CONTROL ARRANGEMENT FOR ELECTRO-
MAGNETIC CLUTCH
Guenther Baumann, Stuttgart, Germany, assignor to
Robert Bosch G.m.b.H., Stuttgart, Germany
Filed July 25, 1962, Ser. No. 212,168
Claims priority, application Germany, July 28, 1961,
B 63,441
18 Claims. (Cl. 192—84)

The present invention concerns a control arrangement for electromagnetic clutches, and more particularly for those types of clutches which are used in connection with a vehicle motor for starting the vehicle to move and in connection with gear shift operations. Clutches of this type are equipped with electromagnet means comprising a winding which is energized by energizing pulses at a frequency increasing with the increase of the rotary speed of the motor and supplied by a monostable relaxation circuit which is triggered in synchronism with the motor speed by control pulses so as to change between its stable blocking condition into its unstable second condition which determines the duration of the energizing pulses.

It is required that clutches of this type are changed to torque transmitting condition by the respective control arrangement whenever the motor speed has been increased to about twice its idling speed. It is necessary that the torque transmitted by the clutch can increase from the smallest possible value available at the idling speed of the motor to a maximum value limited only by the structural dimensions of the clutch in which case the energizing pulses follow each other so rapidly that the magnetic field in the clutch only insignificantly decreases during the intervals between two consecutive energizing pulses.

If a monostable relaxation circuit is used for producing energizing pulses the duration whereof is substantially independent of the rotary speed of the engine, then the time determining element must be selected to be of rather large size in order to obtain a sufficiently strong clutching effect for transmitting a sufficient torque even when at the start of the movement of the vehicle the motor speed is only somewhat higher than the idling speed. However, during the operation of the traveling vehicle the operating speed of the motor must be increased considerably beyond the above mentioned speed used during the start of the movement of the vehicle. However, under such conditions the danger exists that the intervals between the individual consecutive energizing pulses become so short that the storage means forming part of the above mentioned time determining element, e.g. a capacitor, cannot be charged sufficiently before the start of the next following energizing pulse, or it is even possible that control pulses are produced within the period of a corresponding energizing pulse. Under these circumstances a control pulse could not be responded to by the relaxation circuit, with the result that the energizing pulses would occur at a frequency which actually corresponds to only one half of the actually existing rotary speed of the engine. Such a drop of the frequency of the energizing pulses may occur as the actual operating speed of the motor increases and at least when the spacing between the control pulses has the same duration as the energizing pulses themselves.

It is therefore one of the objects of this invention to prevent the above mentioned drop in the frequency of the energizing pulses and the corresponding drop of the transmittable torque to one half of the desired value, by means of a purely electronic arrangement.

Other objects will become apparent from the following description of embodiments of the invention.

With above objects in mind the invention provides in an automotive vehicle having an engine and an electromagnetic clutch arrangement including electromagnetically activable clutch members, one thereof being connected with one, the other one being connected with another one of two rotatable members and adapted to transmit torque from one to the other member upon application of pulsating electric energy to said electromagnetic clutch arrangement, in combination, a source of electric energy; electric pulse generator means cooperating with the engine for furnishing electric control pulses in rhythm with the operational cycles of the engine; electric oscillator means energized by said source and having input means for being supplied with said control pulses and furnishing in accordance therewith energizing pulses of predetermined duration to the electromagnetic clutch arrangement for energizing the latter; and electronic storage means cooperating with said oscillator means and having input means connected in parallel with said input means of said oscillator means, for storing any particular one of said control pulses applied to said input means during one of said energizing pulses of predetermined duration and therefore incapable of causing the production of a corresponding subsequent energizing pulse, and for terminating the application of the respective energizing pulse to the electromagnetic clutch arrangement at the moment of the application of said particular control pulse and for causing said oscillator means to furnish to said electromagnetic clutch arrangement a further energizing pulse a predetermined amount of time after the termination of the preceding energizing pulse.

Preferably a bistable multivibrator is provided as storage means and comprises an input transistor the control circuit whereof is connected in parallel with that of the electric oscillator means. It is of advantage to connect the base of the input transistor with a voltage divider composed of at least three series-connected resistors, while a junction point of this voltage divider is also connected with the collector of an output transistor cooperating with said input transistor and having its base connected with a junction point of a second voltage divider also composed of at least three resistors, the second junction point of this second voltage divider being connected with the collector of the input transistor and also via a capacitor with the input of the oscillator means, a rectifier being preferably connected in series with the last mentioned capacitor.

If the vehicle motor operates on the basis of self-ignition then the control pulses required for triggering the oscillator means can be produced in a comparatively simple manner if according to the invention a single phase or three phase generator is coupled with the engine, the generator furnishing via one or several rectifiers a voltage substantially independent of the engine speed to a storage battery which then serves as a source of energy for the oscillator means. In this case at low rotary speeds of the engine and of the generator control pulses of comparatively long duration are produced. However, the danger would exist that the storage means produce a frequency of the energizing pulses which is independent of the actual engine speed. This can be avoided if the output transistor of the multivibrator serving as a storage means is connected via a capacitor with the collector of the oscillator output transistor connected with the clutch magnet winding, or if a differentiation stage is provided between the interconnected inputs of the oscillator means and of the multivibrator and an output winding of the generator furnishing the control pulses, said differentiation stage being connected via a capacitor with the above mentioned inputs. With the aid of this stage the control pulses taken from the output winding of the generator can be kept so short that undesirable or untimely control pulses cannot be delivered by the storage means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
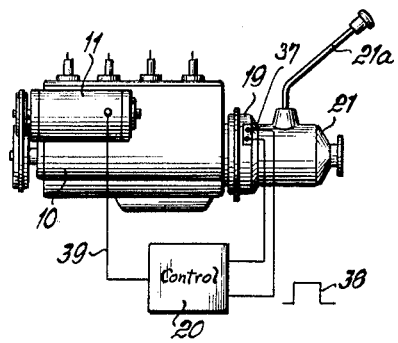
FIG. 1 is a diagrammatic illustration of a four-cylinder four-stroke internal combustion engine equipped with an electromagnetic clutch and with an electronic control apparatus.

Referring now to FIG. 1, the internal combustion engine 10 operating a vehicle not shown in the drawing cooperates with a three-phase generator 11 the output windings 12, 13 and 14 whereof are connected via three pairs of interconnected semi-conductor rectifiers 15, via a positive line 16 and a negative line 17 with a storage battery 18 of 24 volts. The generator 11 is controlled by conventional regulator means not shown in the drawing in such a manner that the output voltage thereof is kept at a constant amplitude at all those rotary speeds of the engine which may occur during the operation of the motor vehicle. An electromagnetic clutch having a housing 19 is mounted at one end of the engine 10 and is controlled by electric control means 20, illustrated in more detail in FIG. 3, in such a manner that the clutch is automatically changed to torque transmitting condition as soon as the rotary speed of the engine increases to a point which is above the minimum or idling speed of the engine. A conventional gear box 21 is mounted next to the housing 19 of the electromagnetic clutch, the various gear combinations being controllable by a conventional gear shift lever 21a.

Figure 2:
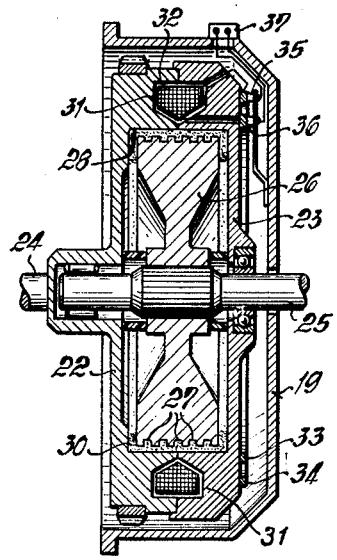
FIG. 2 is a diagrammatic axial section through an electromagnetic clutch as shown in FIG. 1.

As shown at a larger scale in FIG. 2, the electromagnetic clutch comprises within its housing 19 two concave plate members 22 and 23 which constitute together a hollow shell rigidly connected with the crank shaft 24 of the engine and constituting at the same time the fly wheel of the engine. Additionally the clutch comprises a rotor 26 mounted on the drive shaft 25 and provided with a plurality of grooves 27 arranged along the circumference of the rotor. In practical embodiments of this type of a clutch an annular gap of 1 to 2 mm. radial width is provided between the circumference of the rotor 26 and the inner circumferential face 28 of the above mentioned shell. The empty space between the shell members 22, 23 and the rotor 26 is partly filled with a magnetizable powder 30 which is driven by centrifugal force into the above mentioned annular gap as soon as the engine is in operation. In two faces of the members 22 and 23 abutting against each other annular grooves 31 are provided and accommodate a magnet winding 32. The ends of the magnet winding 32 are connected with slip rings 33 and 34, respectively, which are mounted on the outer face of the member 23 and are insulated against each other. Two brushes 35 and 36 insulated against each other cooperate with the slip rings, respectively, and are connected with a terminal block 37 mounted on the outside of the housing 19, and the terminals of this terminal box, and thereby the magnet winding 32, are connected with the control arrangement 20. This control arrangement furnishes the electric energy required for the transmission of torque in the form of approximately rectangular pulses one of which is diagrammatically indicated at 38 in FIG. 1. For producing these pulses the input of the control arrangement 20 is connected with the winding 12 of the generator 11 as shown in greater detail in FIG. 3, by means of a cable connection 39 by means of which a control pulse for triggering an energizing pulse is transmitted to the control arrangement 20 with each revolution of the armature of the generator 11.

Figure 3:
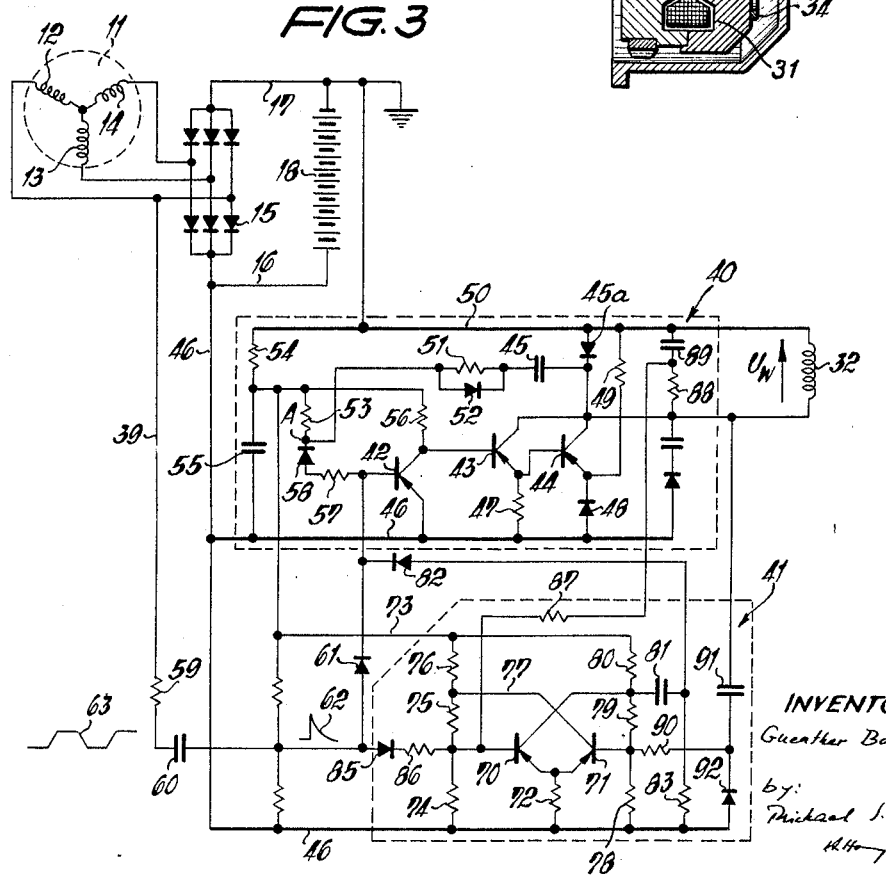
FIG. 3 is a schematic circuit diagram of the electric control arrangement for controlling the electromagnetic clutch.

Referring now to FIG. 3, the control arrangement comprises a relaxation oscillator 40 indicated by a dotted line surrounding the components thereof, and further an electronic storage arrangement 41 also indicated by a dotted line surrounding the respective components. Those control pulses which are applied to the oscillator during the duration of an energizing pulse and which therefore cannot be immediately utilized are stored by the storage device until the respective energizing pulse is terminated.

The monostable relaxation oscillator 40 comprises an input transistor 42, a current amplifying transistor 43 and an output transistor 44 operating in synchronism with the transistor 43, and finally a capacitor 45 of about .6 μf. which serves as time determining element.

The emitter of the input transistor 42 is directly connected with the positive line 46 leading to the positive terminal of the storage battery 18. The emitter of the amplifying transistor 43 is directly connected with the base of the output transistor 44 and additionally, via a resistor 47 of about 30 ohms, with the above mentioned line 46. Between the line 46 and the emitter of the output transistor 44 a rectifier 48 is provided which is operated in its conductive condition and which constitutes a voltage divider together with a resistor 49 of 1000 ohms connected at its other end with the negative line 50. This voltage divider assures that the output transistor 44 is rendered completely non-conductive in the intervals between two consecutive energizing pulses 38 which are applied to the magnet winding 32 of the clutch by the output transistor 44 in synchronism with the rotary speed of the generator 11 and which are to be maintained at constant duration irrespective of variations of the rotary speed of the engine.

The capacitor 45 which serves as a time determining element for determining the duration of the individual energizing pulses 38 is connected at one terminal thereof with the collector of the output transistor 44 and with the rectifier 45 connected in parallel with the magnet winding 32 for suppressing inductive voltage peaks, while the other terminal of the capacitor 45 is connected via a resistor 51 of 4700 ohms and a rectifier 52 connected in parallel therewith, with a junction point A which in turn is connected via a resistor 53 of 15,000 ohms and a resistor 54 of 500 ohms with the negative line 50. The resistor 54 is provided only for convenience and has no significant function within the scope of this invention. This resistor in cooperation with an electrolytic capacitor 55 of 50 μf. serves the purpose of protecting the input transistor 42 against transitory excess potentials which may develop in the alternating current windings of the generator when the supply of strong currents to other not shown current consumers is switched off.

The above mentioned resistor 53 is not only connected at one end with the resistor 54 but also with a resistor 56 of 800 ohms the other end of which is connected with the collector of the input transistor 42 and with the base of the amplifying transistor 43. Between the base of the input transistor 42 and the junction point A a resistor 57 of 300 ohms and a rectifier 58 adapted to pass the base current of the input transistor 42 are arranged as shown. The current flowing through the resistor 57, the rectifier 58 and the resistors 53 and 54 maintains the input transistor 42 in conductive condition and the latter holds the two transistors 43 and 44 in non-conductive condition until a positive control pulse 62 is applied to the base of the input transistor 42 via the line 39, a resistor 59 of 500 ohms, a capacitor 60 of 1 μf. and a rectifier 61. The control pulse 62 is generated by differentiation, by means of the RC circuit 59, 60, of the wave form or voltage 63 appearing, as indicated, in the line 39 and appearing at a frequency which increases with the rotary speed of the generator and of the engine. The control pulses 62 starting, as shown in FIG. 4, at the moments $t_1$ follow each other in intervals which are the shorter the faster the engine operates.

As soon as a control pulse 62 reaches the base of the input transistor 42 which was up to then in conductive condition, this transistor is rendered non-conductive and therefore renders the two transistors 43 and 44 conductive.

During the now terminated non-conductive condition of the output transistor 44 that electrode of the capacitor 45 which is connected with the collector of the transistor 44 carried, via the currentless winding 32, the potential of the negative line 50. The other capacitor electrode was connected via rectifier 52 with the junction point A which, the input transistor 42 being in conductive condition, carried a potential which was only slightly lower than that of the positive line 46. In the above mentioned moment of the control operation, indicated at $t_1$ in the diagram of FIG. 4, the capacitor 45 carries a charge corresponding to the output voltage of the storage battery 18. This voltage is added to the voltage $U_w$ appearing across the winding 32 as soon as the two transistors 43 and 44 are rendered conductive. Hereby the base potential of the input transistor 42 is increased beyond the potential of the positive line 46 in positive direction and the transistor 42 is held in non-conductive condition even after the control pulse 62 has decayed. This non-conductive condition of the input transistor 42 which determines the duration of the energizing pulse 38 is terminated and the transistor 43 and 44 are simultaneously rendered non-conductive, only when the capacitor 45 has discharged via the resistor 51 and the resistors 53 and 54.

Figure 4:
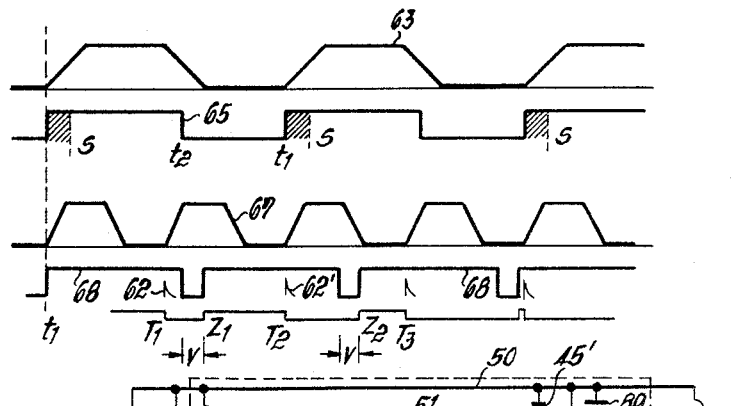
FIG. 4 is composed of time diagrams illustrating the operation of the arrangement according to the invention.

In the diagram according to FIG. 4 the uppermost curve or wave form 63 illustrates the variation of the voltage furnished by the generator winding 12. Every time when this voltage starts to rise at the moments $t_1$ the transistors 43 and 44 are rendered conductive. The second curve or wave form 65 of substantially rectangular shape indicates the variations of the voltage $U_w$ with time as this voltage appears across the clutch winding 32, $t_2$ indicating those moments in which the transistors 43 and 44 are again rendered non-conductive. The discharge time of the capacitor 45 reaches from the moment $t_1$ to the moment $t_2$ and this shows that the duration of the energizing pulses is independent of the actual or varying rotary speed of the engine. The intervals between the energizing pulses are therefore bound to decrease the faster the engine 10 operates.

In order to illustrate this the diagrammatic curves 63 and 65 which apply to a rotary speed of $n_1=1000$ r.p.m. are supplemented by a curve or wave form 67 which illustrates the variations in time of the voltage furnished by the generator winding 12 at a doubled speed $n_2=2000$ r.p.m. The related further curve or wave form 68 indicates the variations of the voltage $U_w$ appearing under these conditions across the clutch winding 32. It can be seen that at this speed the control pulses 62, 62' etc. generated at the moments $T_1$, $T_2$, $T_3$ etc. with every rise of the generator voltage follow each other so rapidly that they occur during the duration of energizing pulses 68. However, since the input transistor 42 is in non-conductive condition during the duration of an energizing pulse 38 the positive control pulses 62 cannot be utilized by the oscillator 40. Thus, the storage arrangement 41 has to store such impulses and to release them only after the respective energizing pulse 38 has decayed and to deliver them then to the oscillator 40 for giving rise to another energizing pulse.

For this purpose the storage arrangement 41 comprises an input transistor 70 and an output transistor 71, the emitters whereof are both connected via a common resistor 72 with the positive line 46. An auxiliary connection line 73 is connected with a junction point between the above mentioned resistors 53 and 54. Between the auxiliary line 73 and the positive line 46 two similar voltage dividers, each composed of three resistors, are connected. The first of these voltage dividers comprises a resistor 74 of 1200 ohms connected between the base of the input transistor 70 and the positive line 46, and two resistors 75 of 12,000 ohms and 76 of 5000 ohms, the junction point therebetween being connected by a line 77 with the collector of the output transistor 71. In a similar manner a resistor 78 of 1200 ohms is provided between the base of the output transistor 71 and the positive line 46. The second voltage divider comprises the just mentioned resistor 78 and, in series therewith, two resistors 79 of 12,000 ohms and 80 of 5000 ohms, the junction point therebetween being connected with the collector of the input transistor 70. In addition, this collector of the input transistor 70 is connected with one electrode of a capacitor 81 of .2 μf. The other electrode thereof is connected via a rectifier 82 with the base of the input transistor 42 of the oscillator 40, and also via a resistor 83 with the positive line 46.

The control pulses 62 which cannot immediately be utilized by the oscillator 40 as mentioned above are applied to the input transistor 70 of the storage arrangement 41 via a rectifier 85 and a resistor 86 of 3000 ohms so as to reach the base of transistor 70, the latter being connected via a resistor 87 of 4000 ohms with the junction point between a resistor 88 of 3000 ohms connected with the collector of the output transistor 44, and a capacitor 89 of 1 μf. which, in turn, is connected with the negative line 50. The magnitude of the resistors 87 and 88 is so chosen that the input transistor 70 is held in its conductive condition as long as the transistors 43 and 44 of the oscillator are in non-conductive condition so that no magnetizing current can flow through the clutch winding 32. If now during the intervals between consecutive energizing pulses a control pulse 62 is generated, then this control pulse can only actuate the oscillator 40 while having no effect on the storage arrangement 41. However, if a control pulse 62 is generated while the clutch winding 32 is being supplied via transistors 43 and 44 with an energizing pulse so that the resistor 88 carries a strongly positive potential only slightly below the potential of the positive line 46, then the small potential increase caused by the control pulse is not sufficient for rendering the input transistor 70 non-conductive. Simultaneously the up to then non-conductive output transistor 71 of the storage arrangement 41 is rendered conductive and carries now via the resistor 76 a collector current of such magnitude that the transistor 70 is held non-conductive beyond the termination of the control pulse 62. As soon as the still active energizing pulse 38 terminates and the transistors 43 and 44 return to non-conductive condition, the capacitor 89 which has been charged during the duration of the energizing pulse to approximately the output voltage of the battery 18, starts to discharge via the resistor 88 and the clutch winding 32. Consequently the input transistor is held in non-conductive condition beyond the end of that energizing pulse and can return to its original conductive condition only when the capacitor 89 has discharged during the thereby created delay period v so that the connection of the base of the input transistor 70 can take effect across the magnet winding 32 and across the resistors 87 and 88 which are comparatively small as compared with the resistors 75 and 76. The input transistor becomes conductive again at the moment marked $Z_1$ in FIG. 4 and produces across the resistor 80 a considerable voltage drop whereby simultaneously the output transistor 71 is rendered non-conductive. To the voltage drop across resistor 80 is added the potential available at the previously charged capacitor 81 whereby the base potential of the input transistor 42 of the oscillator 40 is raised in positive direction beyond the potential of the positive line 46. Therefore at the moment $Z_1$ the input transistor 42 is rendered non-conductive and at the same time a new energizing pulse is produced by the transistors 43 and 44 which become again conductive. In FIG. 4 the next following control pulse is marked 62'. Also this impulse occurs during the duration of the previously released and still active energizing pulse 68 at the moment $T_2$ and renders the input transistor 70 of the storage arrangement 41 non-conductive until, after a constant delay period $v$ determined by the capacitor 89 and the resistor 88, this delay period starting at the end of the respective energizing pulse, the oscillator 40 is caused to generate another energizing pulse at the moment $Z_2$.

The delay $v$ constitutes the interval between consecutive energizing pulses. The particular advantage of this arrangement is that all the control pulses can be utilized even when the engine speed is increased beyond the point where control pulses occur in the intervals between consecutive energizing pulses. Without the storage arrangement every second energizing pulse would be skipped at such elevated speeds. The consequence would be that the transmittable torque would drop to a value equal to that which corresponds to one half of the actual speed.

Since the control pulse or voltage is derived from the generator coupled with the engine the difficulty results that at low speeds the control pulse has a considerable duration so that the danger exists that at the start of a control pulse not only the oscillator 40 is caused to initiate an energizing pulse, but that this pulse is also applied to the storage arrangement and initiates after the end of the energizing pulse another energizing pulse which at the particular speed should be initiated only much later by the next following control pulse. This is due to the fact that the capacitor 89 is quickly charged upon the initiation of an energizing pulse and thereby causes the storage arrangement to be ready for receiving a control pulse because in this case the base potential of the input transistor 70 is raised via the resistors 87 and 88. Consequently, if the control pulse has a duration extending beyond the moment in which the capacitor 89 reaches its charged potential, it is able to render the input transistor 70 non-conductive and to initiate the storing operation. In order to prevent this, means are provided for additionally blocking the output transistor 71 of the storage arrangement 41 at the start of an energizing pulse. This is achieved by means of a capacitor 91 of 1 µf. connected on one side with the collector of the output transistor 44 and on the other side with the base of the output transistor 71 via a resistor 90 of 18,000 ohms. This capacitor is charged to source potential during the intervals between consecutive energizing pulses. As soon as at the start of the next following energizing pulse the collector potential of the output transistor 44 rises considerably, this capacitor will raise the base potential of the output transistor 71 above the potential of the positive line 46 and holds thereby the output transistor in non-conductive condition until the control pulse has decayed completely. In this manner the storage arrangement is blocked from the start of each energizing pulse for a brief period of time which corresponds to the longest pulse duration. This is illustrated in FIG. 4 in the diagram related to 1000 r.p.m. and indicating the variations of the clutch voltage $U_W$, marked 65, by small shaded areas which extend in each case from the moment $t_1$ to the moment S.

A rectifier 92 is provided between the positive line 46 and that electrode of capacitor 91 which is connected with the resistor 90, the rectifier 92 being connected in parallel with the resistors 78 and 90 whereby it is assured that the capacitor 91 is able to be charged rapidly at the end of each energizing pulse.

Figure 5:
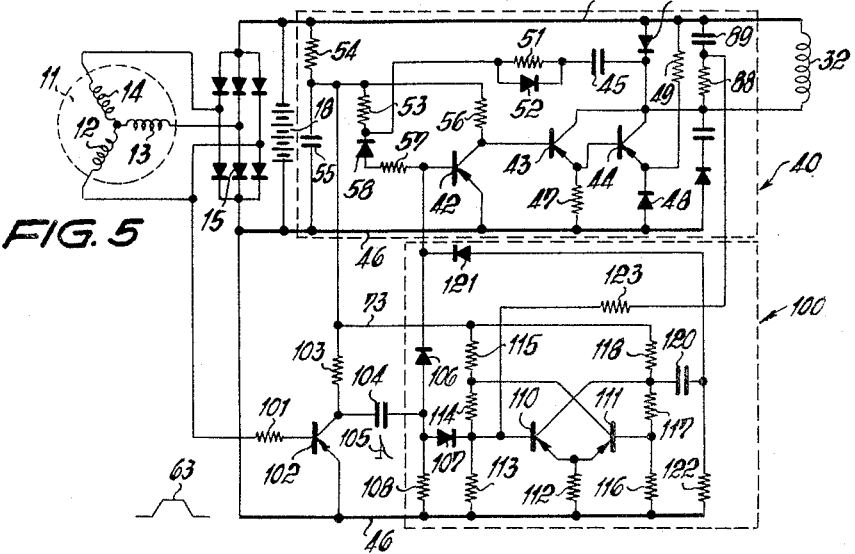
FIG. 5 is a schematic electric circuit diagram of a modification of the control arrangement according to FIG. 1.

In the embodiment according to FIG. 5 the above described oscillator 40 is incorporated substantially without change. However, the storage arrangement 100 includes some noticeable improvements due to the provision of an additional differentiating stage. This stage comprises a transistor 102 which is connected at its base via a resistor 101 with the output winding of the alternating current generator 11. The collector of this transistor is connected via a resistor 103 of 5,000 ohms with the auxiliary connection 73 leading to the junction point between the resistors 53 and 54 of the oscillator. The transistor 102 is strongly overdriven by the voltage 63 derived from the output winding 12. A capacitor 104 of .05 µf. connected with its collector furnishes therefore even at low speeds of the engine and of the generator very narrow control pulses 105 which are applied to the oscillator via a rectifier 106 and to the hereafter described pulse-storing bistable multivibrator via a rectifier 107. A resistor 108 of 10,000 ohms is connected between the positive line 46 and the input electrodes of the rectifiers 106 and 107. The multivibrator comprises an input transistor 110 and an output transistor 111 the emitters whereof are interconnected with each other and are connected with the positive line 46 via a common resistor 112 of 100 ohms. In the same manner as in the storage arrangement according to FIG. 3 two voltage dividers are provided. The first voltage divider comprises a resistor 113 (1000 ohms) connected between the positive line 46 and the base of the transistor 110, a resistor 114 of 5,000 ohms connected with the collector of the output transistor 111, and a resistor 115 of 2,000 ohms connected with the auxiliary connection 73. The second voltage divider comprises a resistor 116 of 1000 ohms, a resistor 117 of 5,000 ohms and a resistor 118 of 2,000 ohms, connected as shown. From the junction point between the resistors 117 and 118 connected with the collector of the input transistor 110 a line is taken to a capacitor 120 which is connected with the base of the input transistor 42 via a rectifier 121, and with the positive line 46 via a resistor 122 of 3,000 ohms. For actuating the storage arrangement a resistor 123 is provided like in FIG. 3 which is connected with the capacitor 89 and the resistor 88 of the oscillator. Via this resistor 123 the input transistor 110 is rendered again conductive after the delay time $v$ following the end of each energizing pulse as indicated in FIG. 4, provided that the transistor 110 had been blocked for storing a control pulse 105 that could not be utilized by the oscillator so that in this manner the storing of such control pulse has been effected.

The advantage of the embodiment according to FIG. 5 over that of FIG. 3 consists in that no steps need be taken for blocking the storage arrangement at the start of an energizing pulse because due to the action of the differentiating stage the control pulses become so narrow that the above described undesired storage cannot take place.

It will be understood that each of the elements described above, or two or more together, may also find a useful application if other types of electromagnetic clutch controls differ from the types described above.

While the invention has been illustrated and described as embodied in a specific type of clutch control, it is to be understood that it is not intended to be limited to the details thereof as shown, since various modifications and structural changes may be made without departing in any way from the spirit of the present invention.

Without further analysis, the foregoing will also fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electromagnetic clutch arrangement, in combination, a source of electric energy; electric pulse generator means for furnishing electric control pulses at a variable frequency; electric oscillator means energizable by said source and having input means for being supplied with said control pulses and furnishing in accordance therewith energizing pulses of predetermined duration to the electromagnetic clutch arrangement for energizing the latter; and electronic storage means cooperating with said oscillator means and having input means connected in parallel with said input means of said oscillator means, for storing any particular one of said control pulses applied to said input means during one of said energizing pulses of predetermined duration and therefore incapable of causing the production of a corresponding subsequent energizing pulse, and for terminating the application of the respective energizing pulse to the electromagnetic clutch arrangement at the moment of the application of said particular control pulse and for causing said oscillator means to furnish to said electromagnetic clutch arrangement a further energizing pulse a predetermined amount of time after the termination of the preceding energizing pulse.

2. In an electromagnetic clutch arrangement, in combination, a source of electric energy; electric pulse generator means for furnishing electric control pulses at a variable frequency; monostable relaxation oscillator means energizable by said source and having input transistor means for being supplied with said control pulses and output transistor means furnishing in accordance therewith energizing pulses of predetermined duration to the electromagnetic clutch arrangement for energizing the latter; and electronic storage means cooperating with said oscillator means and comprising bistable multivibrator means having input transistor means and including a control circuit connected in parallel with said input means of said oscillator means, for storing any particular one of said control pulses applied to said input means during one of said energizing pulses of predetermined duration and therefore incapable of causing the production of a corresponding subsequent energizing pulse, and for terminating the application of the respective energizing pulse to the electromagnetic clutch arrangement at the moment of the application of said particular control pulse and for causing said oscillator means to furnish to said electromagnetic clutch arrangement a further energizing pulse a predetermined amount of time after the termination of the preceding energizing pulse.

3. An arrangement as claimed in claim 2, wherein said bistable multivibrator means further includes output transistor means and first and second voltage divider means connected between the terminals of said source, each comprising at least three series-connected resistor means with a first and a second junction point therebetween, said first voltage divider means having its first junction point connected with the base of said input transistor means and having its second junction point connected with the collector of said output transistor means, and said second voltage divider means having its first junction point connected with the base of said output transistor means and having its second junction point connected with the collector of said input transistor means.

4. In an electromagnetic clutch arrangement, in combination, a source of electric energy; alternating current generator means for furnishing from one of its outputs electric control pulses at a variable frequency; electric oscillator means energizable by said source and having input means for being supplied with said control pulses and furnishing in accordance therewith energizing pulses of predetermined duration to the electromagnetic clutch arrangement for energizing the latter; and electronic storage means cooperating with said oscillator means and having input means connected in parallel with said input means of said oscillator means, for storing any particular one of said control pulses applied to said input means during one of said energizing pulses of predetermined duration and therefore incapable of causing the production of a corresponding subsequent energizing pulse, and for terminating the application of the respective energizing pulse to the electromagnetic clutch arrangement at the moment of the application of said particular control pulse and for causing said oscillator means to furnish to said electromagnetic clutch arrangement a further energizing pulse a predetermined amount of time after the termination of the preceding energizing pulse.

5. In an electromagnetic clutch arrangement, in combination, a source of electric energy; alternating current generator means for furnishing from one of its outputs electric control pulses at a variable frequency; monostable relaxation oscillator means energizable by said source and having input transistor means for being supplied with said control pulses and output transistor means furnishing in accordance therewith energizing pulses of predetermined duration to the electromagnetic clutch arrangement for energizing the latter; and electronic storage means cooperating with said oscillator means and comprising bistable multivibrator means having input transistor means including a control circuit connected in parallel with said input means of said oscillator means, for storing any particular one of said control pulses applied to said input means during one of said energizing pulses of predetermined duration and therefore incapable of causing the production of a corresponding subsequent energizing pulse, and for terminating the application of the respective energizing pulse to the electromagnetic clutch arrangement at the moment of the application of said particular control pulse and for causing said oscillator means to furnish to said electromagnetic clutch arrangement a further energizing pulse a predetermined amount of time after the termination of the preceding energizing pulse.

6. An arrangement as claimed in claim 5, wherein said bistable multivibrator means further includes output transistor means and first and second voltage divider means connected between the terminals of said source, each comprising at least three series-connected resistor means with a first and a second junction point therebetween, said first voltage divider means having its first junction point connected with the base of said input transistor means and having its second junction point connected with the collector of said output transistor means, and said second voltage divider means having its first junction point connected with the base of said output transistor means and having its second junction point connected with the collector of said input transistor means.

7. An arrangement as claimed in claim 2, wherein two rectifier means connected with each other in series with mutually opposite directions of conductivity are connected between said input means of said oscillator means and said storage means, the junction point between said rectifier means being connected with said electric pulse generator means for receiving said control pulses therefrom.

8. An arrangement as claimed in claim 3, wherein two rectifier means connected with each other in series with mutually opposite directions of conductivity are connected between said input transistor means of said monostable relaxation oscillator means and said input transistor means of said bistable multivibrator means, the junction point between said rectifier means being connected with said electric pulse generator means for receiving said control pulses therefrom.

9. An arrangement as claimed in claim 7, including amplifying transistor means and capacitor means connected in series between one output of said electric pulse generator means and said junction point between said rectifier means.

10. An arrangement as claimed in claim 8, including amplifying transistor means and capacitor means connected in series between one output of said electric pulse generator means and said junction point between said rectifier means.

11. In an electromagnetic clutch arrangement, in combination, a source of electric energy; electric pulse generator means for furnishing electric control pulses at a variable frequency; monostable relaxation oscillator means energized by said source and having input transistor means and amplifying transistor means for being supplied with said control pulses and output transistor means furnishing in accordance therewith energizing pulses of predetermined duration to the electromagnetic clutch arrangement for energizing the latter; and electronic storage means cooperating with said oscillator means and comprising bistable multivibrator means having input transistor means including a control circuit connected in parallel with said input means of said oscillator means, for storing any particular one of said control pulses applied to said input means during one of said energizing pulses of predetermined duration and therefore incapable of causing the production of a corresponding subsequent energizing pulse, and for terminating the application of the respective energizing pulse to the electromagnetic clutch arrangement at the moment of the application of said particular control pulse and for causing said oscillator means to furnish to said electromagnetic clutch arrangement a further energizing pulse a predetermined amount of time after the termination of the preceding energizing pulse.

12. An arrangement as claimed in claim 11, wherein two rectifier means connected with each other in series with mutually opposite directions of conductivity are connected between the base of said input transistor means of said monostable relaxation oscillator means and the base of said input transistor means of said bistable multivibrator means, amplifying transistor means and capacitor means being connected in series between one output of said electric pulse generator means and the junction point between said two rectifier means.

13. An arrangement as claimed in claim 2, wherein a series-combination of capacitor means and rectifier means is connected between the base of said input transistor means of said monostable relaxation oscillator means and the collector of said input transistor means of said bistable multivibrator means.

14. An arrangement as claimed in claim 11, wherein a series-combination of capacitor means and rectifier means is connected between the base of said input transistor means of said monostable relaxation oscillator means and the collector of said input transistor means of said bistable multivibrator means.

15. An arrangement as claimed in claim 2, wherein a series-combination of resistor means and capacitor means is connected in parallel with electromagnetic clutch arrangement, and a further resistor means is connected between the junction point between said resistor means and said capacitor means of said last mentioned series-combination, on one hand, and the base of said input transistor means of said bistable multivibrator means, on the other hand.

16. An arrangement as claimed in claim 11, wherein a series-combination of resistor means and capacitor means is connected in parallel with the electromagnetic clutch arrangement, and a further resistor means is connected between the junction point between said resistor means and said capacitor means of said last mentioned series-combination, on one hand, and the base of said input transistor means of said bistable multivibrator means, on the other hand.

17. An arrangement as claimed in claim 15, wherein a series-combination of resistor means and capacitor means is connected between the base of said output transistor means of said bistable multivibrator means and the collector of said output transistor means of said relaxation oscillator means.

18. An arrangement as claimed in claim 16, wherein a series-combination of resistor means and capacitor means is connected between the base of said output transistor means of said bistable multivibrator means and the collector of said output transistor means of said relaxation oscillator means.

References Cited by the Examiner
UNITED STATES PATENTS

| | | | |
|---|---|---|---|
| 2,714,435 | 8/55 | D'Ozouville | 192—3.5 |
| 2,747,710 | 5/56 | Smith | 192—84 |
| 2,857,769 | 10/58 | Bale | 74—125.5 X |
| 2,972,056 | 2/61 | Park. | |
| 2,995,690 | 8/61 | Lemon | 318—138 |
| 3,034,364 | 5/62 | Budlong | 74—125.5 X |
| 3,083,326 | 3/63 | Denning | 318—138 |
| 3,094,202 | 6/63 | Issler | 192—21.5 X |
| 3,098,398 | 7/63 | Ryan | 74—125.5 X |
| 3,126,989 | 3/64 | Baumann | 192—3.5 |

BROUGHTON G. DURHAM, *Primary Examiner.*